Dec. 31, 1963   R. B. HOWLE   3,116,241
ION EXCHANGE MATERIAL REGENERATION PROCESS
Filed Sept. 22, 1960
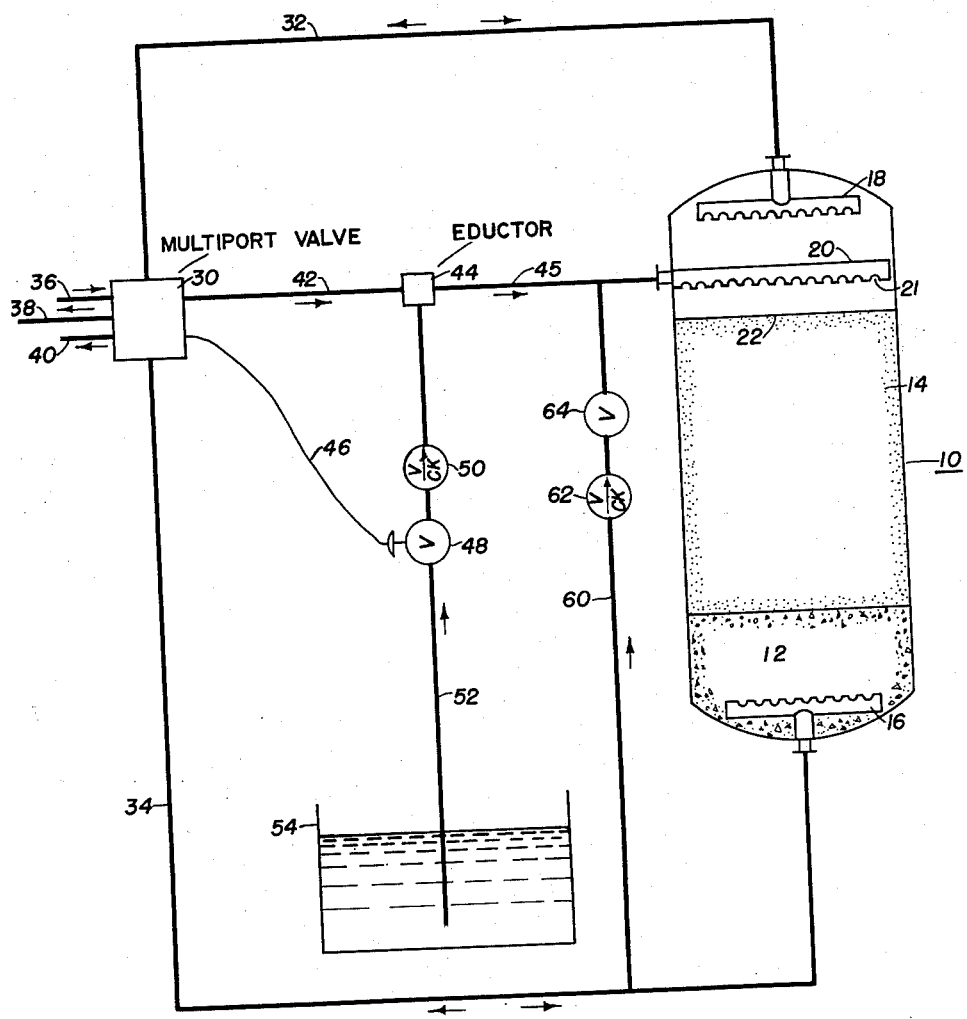
INVENTOR.
RAY B. HOWLE
BY
ATTORNEY

3,116,241
ION EXCHANGE MATERIAL REGENERATION PROCESS
Ray B. Howle, Nederland, Tex., assignor to The Pure Oil Company, Chicago, Ill., a corporation of Ohio
Filed Sept. 22, 1960, Ser. No. 57,681
3 Claims. (Cl. 210—35)

This invention is directed to an improved fluid treating apparatus. More particularly, the invention is directed to an improved ion exchange apparatus adapted for use in softening water.

Water softening devices of the ion exchange type have long been in use. Such devices commonly comprise a vessel adapted to hold a bed of ion exchange material, a fluid inlet and outlet header disposed at the top of the vessel, and a second inlet and outlet header disposed at the bottom of the vessel. Between these headers, and above the top of the bed of ion exchange material, is disposed a fluid distribution header adapted to distribute a regeneration liquid, conventionally brine, for passage downward through the ion exchange bed.

Back-washing of the ion exchange bed is generally necessary to move sediment and impurities filtered from the treated water during the softening cycle, and whereas flow through the bed is generally from the top of the vessel towards the bottom in the softening cycle, reverse flow of water is provided during the back-wash. The upward flow of water rolls and washes the ion exchange beads and minute particles of sludge, sediment and ion exchange materials wash upward and are discharged along with the back-wash water through the inlet and outlet distribution header at the top of the vessel. Some sediment and small particles of ion exchange material enter the orifices of the regeneration fluid distribution header, through which no fluid conventionally flows during the back-wash. The accumulation of particles eventually plugs the header orifices, and results in inefficient regeneration of the bed and eventually necessitates the disassembly and cleaning of the header.

It is an object of this invention to provide a novel fluid treatment apparatus and method in which plugging of the regenerating fluid distribution header during back-wash is simply, effectively eliminated. Another object of this invention is to provide an ion exchange apparatus and method in which plugging of the brine distribution header during back-wash is automatically eliminated.

Briefly, the improvement of this invention comprises providing a check valve controlled fluid conduit communicating the lower inlet and outlet header with the regeneration fluid distribution header, so that during back-wash the normal pressure drop in the nozzles of the lower inlet and outlet distribution header, together with the pressure drop across the ion exchange bed, is effective to produce a flow of fluid outward through the orifices of the brine distribution header, thereby preventing the entry of plugging particles into the header.

This invention is best described with reference to the drawing, which depicts schematically a conventional ion exchange apparatus in which has been incorporated the improvement of this invention. Vessel 10 contains a graded gravel bed 12 and an ion exchange bed 14. A lower fluid inlet and outlet header 16 is disposed adjacent the bottom of vessel 10, and an upper fluid inlet and outlet distribution header 18 is disposed at the top of the vessel. Regeneration fluid distribution header 20 is disposed between the inlet and outlet headers 16 and 18, preferably above the upper level 22 of ion exchange bed 14, as shown. Each of the described headers contains a plurality of small diameter fluid distribution orifices, such as orifices 21 of header 20. A conventional multiport automatic switching valve 30 is connected through flowline 32 to header 18, and through flowline 34 to header 16. Valve 30 further connects with raw water inlet line 36, treated water outlet line 38, and waste water discharge line 40. Further, lines 42 and 45 connect valve 30 through brine eductor 44 to regeneration fluid distribution header 20. Line 46 connects valve 30 to diaphragm operated brine globe valve 48. Line 52 connects the interior of brine storage tank 54 through diaphragm operated brine globe valve 48 and check valve 50 to the brine eductor 44.

As thus described, the fluid treating apparatus, which may be a water softening ion exchange device, is conventional and known in the prior art. Valve 30 controls the operating cycle of the softener, providing for flow of raw water through line 32 downward through the ion exchange bed, and outward through line 34 and treated water line 38, during the softening cycle. During backwash, the flow of fluid is reversed, raw water entering the bottom of the vessel 10 through line 34 and flowing upward through the ion exchange bed and outward through line 32 and waste line 40. During regeneration, raw water and brine are mixed at brine eductor 44 and flow downward from header 20 through the ion exchange bed, and outward through line 34 and waste line 40.

In accordance with this invention, a fluid conduit 60, controlled by check valve 62, is provided to permit flow in an upward direction from line 34 to line 45 and thus to the regeneration fluid distribution header 20. A gate valve 64 may further be provided in conduit 60; this valve serving only as an emergency control in case of failure of check valve 62. In the apparatus as thus modified, during the back-wash portion of the cycle, fluid entering the vessel 10 through line 34 is divided, a portion of the water flowing upward through line 60, check valve 62, valve 64, line 45 and regeneration fluid distribution header 20. The impetus for this flow is provided by the pressure drop naturally occurring at the orifices of lower distribution header 16 and in the ion exchange bed. The flow of fluid downward through line 60 during other portions of the cycle is effectively prevented by check valve 62 which automatically closes when upward flow of fluid through line 60 ceases. The outward flow of a small portion of the back-wash water through the orifices 21 of brine distribution header 20 is effective to prevent the entry of sediment, sludge, and ion exchange resin particles into header 20 during back-wash. Thus plugging of the header is eliminated. The operation of the device during the remaining portions of the cycle, other than back-wash, is conventional.

While this invention has been described specifically with reference to ion exchange water softening apparatus, it is evident that the inventive novelty is applicable to other fluid treatment devices which contained a plurality of fluid distribution means, one of which is subject to plugging during the back-wash of a bed of particulate solids.

The embodiments of the invention in which an exclusive property or privilege is claimed are defined as follows:

1. In the method of back-washing a bed of particulate ion exchange material contained in a vessel having a fluid inlet and outlet means associated at the upper end thereof, a fluid inlet and outlet means associated at the lower end thereof, and a regeneration fluid distribution header disposed therein between said upper and lower inlet and outlet means, by flowing inert fluid from one of said inlet and outlet means past said header to the other of said inlet and outlet means, the step comprising flowing inert fluid from said header into said tank during backwash at a rate sufficient to prevent entry of particulate matter into said header from said vessel.

2. The method in accordance with claim 1 in which said inert fluid is raw water.

3. The method in accordance with claim 1 in which the period of flow of said inert fluid is substantially coextensive with the period of back-wash.

References Cited in the file of this patent

UNITED STATES PATENTS

| | | |
|---|---|---|
| 1,839,428 | Waugh | Jan. 5, 1932 |
| 2,265,225 | Clark | Dec. 9, 1941 |
| 2,460,036 | Sebald | Jan. 25, 1949 |
| 2,771,424 | Stromquist et al. | Nov. 20, 1956 |

OTHER REFERENCES

Text: "The Mechanics of Filter Bed Agitation," by Fred E. Stuart, copyright 1940 by Activated Alum Corp., Baltimore, Md.